Aug. 4, 1936.  W. B. KLEMPERER ET AL  2,050,187
YIELD LINK
Filed Sept. 7, 1934
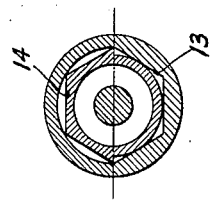
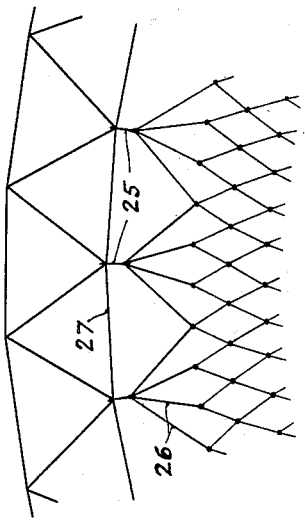
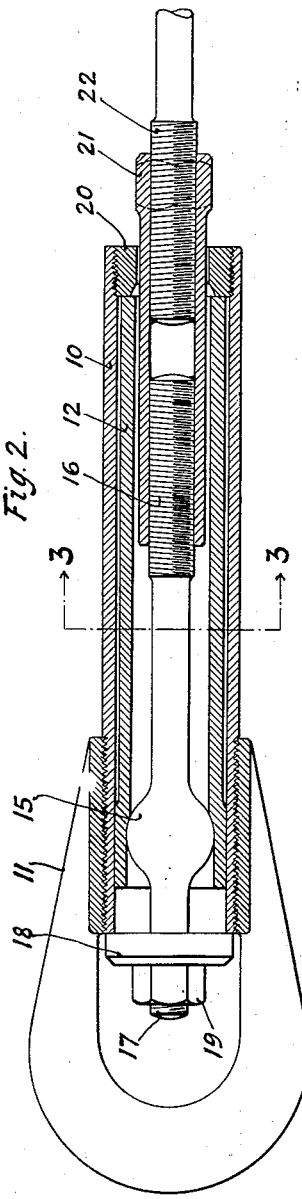
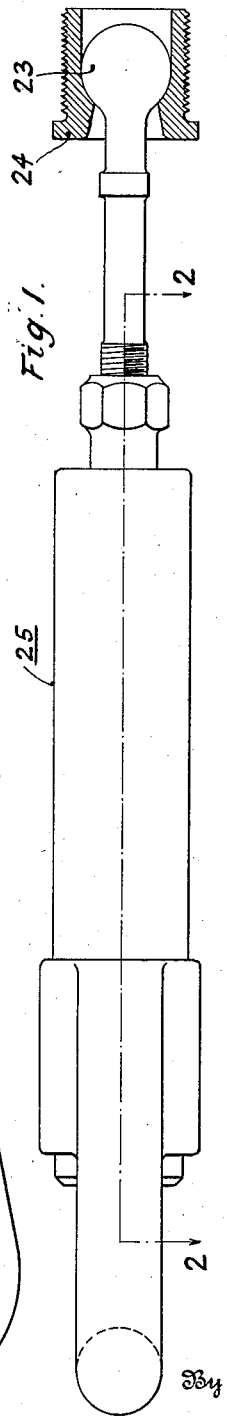
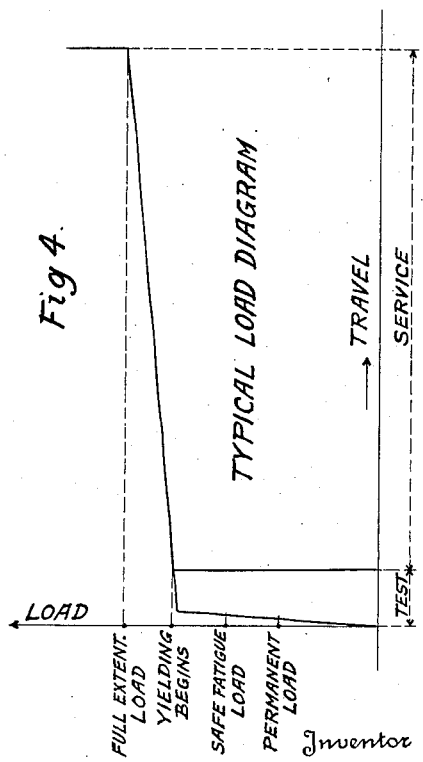
Inventor
WOLFGANG B. KLEMPERER
PAUL D. FFIELD.
By
Attorney Patented Aug. 4, 1936

2,050,187

UNITED STATES PATENT OFFICE 2,050,187

YIELD LINK

Wolfgang B. Klemperer, Silver Lake, and Paul D. Ffield, Akron, Ohio, assignors to Goodyear-Zeppelin Corporation, Akron, Ohio, a corporation of Delaware Application September 7, 1934, Serial No. 743,120

18 Claims. (Cl. 287—1)

This invention relates to a member which is adapted to be inserted into a structure to protect the same against overloads.

In certain structures it is desirable to utilize the elasticity of the structural material itself to a high percentage of its ultimate strength and yet guard against stresses rising considerably above a safe working stress even if deformations much exceeding the normal service deformations should occur in a single emergency. For this purpose it has been suggested to insert a yielding safety member into the structure. These safety means have however in the past functioned to let go completely after reaching their load maximum, which resulted in many instances in failure or damage to the structure. Spring or other resilient means have likewise proved unsatisfactory in many relations to effect the desired results.

One object of this invention is to avoid and overcome the foregoing disadvantages of the prior art by the production of a device which, when yielding, does so gradually and not suddenly or in jerks and which carries increasing loads as it proceeds to yield.

Another object of this invention is to make the device so that it can be reliably and accurately reproduced in quantity and yet in many controllable dimensions of stroke and initial and final strength.

A further object of this invention is to provide a device which is light, small, compact, relatively inexpensive and fool-proof, and particularly adapted for securing airship bulkheads to the main frames of the ship.

The device belongs to the type of safety links in which a ductile metal is made to flow when yielding takes place. It consists of three principal parts, a piston, a cylinder and a soft metal bushing. The latter is fitted more or less snugly but with interspaces as hereafter described into the inside diameter of the cylinder but the bore of the bushing is smaller than the diameter of the piston. When the piston is pressed or pulled through the bore the soft metal bushing is locally deformed and the surplus metal is squeezed into the voids or interspaces. The greater the difference between the diameter of the piston and the bore of the bushing, the more force is required to move the piston. For example, the bore of the ductile bushing can be made slightly tapered so that the carrying capacity of the piston will gradually increase while it is yielding. It also may be desirable for some applications to let the yield load decrease after yielding starts, or perhaps to let it increase to a certain point and then drop or even to let it increase in steps. Any type of load curve or characteristics can be obtained by change in shape of the bushing, for instance a bushing of different longitudinal diameters with the steps provided either inside or outside the bushing, will produce a curve where the load increases in steps.

In order to provide suitable interspaces either the inside of the steel cylinder or the outside of the soft bushing may be made polygonal in cross section. A hexagonal bushing, fitted into the cylinder, has the advantage of simple manufacture and will give the desired result with good satisfaction as has been proven by tests.

The piston itself may have the shape of a ball or at least that portion of it which actually comes in contact with the soft metal may be spherical to good advantage. The bottom of the cylinder is closed by a piston-rod receiving plug against which the piston finally comes to rest after having yielded through the stroke provided.

In order to prevent untimely yielding or creeping during any stage of the construction of the unit or during tests or when subjected to unusual conditions before being put to normal service, the yielding device is provided with a lock which is to be removed immediately prior to the beginning of actual service.

Copper has proven an excellent material for the deforming sleeve. It is best machined while hard and then annealed. A cheap method of manufacturing these sleeves to the proper tapered bore appears to be to first bore them straight to the specified minimum diameter, then machine them outside to nearly the final diameter. Next drive them upon a properly ground tapered mandrel which expands them to the desired taper. Now machine the outside to final dimension and then anneal the whole while still on the mandrel. Finally remove the bushing from mandrel, insert in cylinder and test. Of course material other than copper, for instance, aluminum, lead, annealed soft steel or any other soft material having non-changing physical properties could be employed for the expansion bushing.

It is feasible to test each device for proper service strength by merely sacrificing a very small percentage of the available stroke. This procedure at the same time preferably results in attaining the initial length and a proper seating of the piston.

Naturally, after any full yielding of the device, the soft bushing must be removed and replaced by a new one. As this will occur only after the emergency, for which the device was provided as a safety gear, arose, it should only very seldom become necessary in service.

Where length adjustments between the parts to be joined by the yield link is required, space can be well utilized by making either the piston rod or the cylinder to assume the function of one element of a turnbuckle. For instance, the piston rod can be threaded and the copper cylinder made to accommodate a turnbuckle barrel.

For a better understanding of the invention, reference may now be had to the accompanying drawing, in which:

Fig. 1 is a side view illustrating the device embodying the invention.

Fig. 2 is a cross-sectional view taken on line 2—2 of Fig. 1.

Fig. 3 is a cross-sectional view taken on line 3—3 in Fig. 2, the lower half being a modification of that shown in the upper half.

Fig. 4 is a force diagram showing the load-expansion ratio of a typical device made in accordance with the principles of the present invention.

Fig. 5 is a fragmentary view of a bulkhead netting and main frame of a rigid airship, illustrating the manner in which the yielding device may be employed to connect the same together.

Referring to the drawing, in which one embodiment of the invention has been illustrated in detail in accordance with the patent statutes, a cylinder 10, preferably made of steel tubing, is provided at one end with an outside thread to which is screwed a terminal 11. A bushing or sleeve 12 of ductile material is inserted into the cylinder 10 with a snug fit. Either the inside of the cylinder or the outside of the bushing is provided with a hexagon 13 or 14. These alternatives have both been illustrated in Fig. 3 as described above in connection with the description of Fig. 3.

Before inserting the bushing 12, a ball-shaped piston 15 of a diameter somewhat larger than the inside of the bushing is introduced into the bushing at the wider end of the slightly tapered inside. It will be appreciated that the bushing need not be tapered on the inside although this is thought to be a novel feature of the invention and is preferred in certain applications. The piston 15 may be formed integrally with a threaded piston rod 16. An extension 17 of the piston rod at the other side of the piston may be provided to lock the piston through the agency of a washer 18 and nut 19 seated against one end of the cylinder. Thus undesirable yielding of the device when not desired is prevented. A hollow plug 20 provided with a ball shaped cavity is screwed into the other end of the cylinder and serves as a stop or seat for the bushing 12, and after the yield stroke is completed, as a stop for the piston.

The hole in the plug 20 is made sufficiently large for accommodating a turnbuckle barrel 21 to be screwed onto the piston rod 16. The other turnbuckle bolt 22 threaded in opposite direction is provided with a ball 23 which fits into a fastening socket 24. Any other suitable yield link terminals may, of course, be used instead to better adapt the device to its particular installation.

The assembled yield link, indicated generally by the numeral 25, is ordinarily tested for the force required to start yielding of the piston in the bushing. This yielding action results in shaping the bushing according to the shape of the cylinder walls. Only a short portion of the length of the bushing is employed for testing after which the piston is locked against further yielding by the nut 19. The yield link is now ready to be assembled with the structure in which it is to be used. Fig. 5 shows the application of the yield link in conjunction with an airship bulkhead. The yield link 25 connects the bulkhead wires 26 to the ring structure 27 and by properly adjusting the turnbuckle before or after removing the lock nut 18 and washer 19, the desired tension is imparted to the bulkhead. As soon as the tension in the bulkhead owing to unusual circumstances exceeds a certain amount, which is well above the ordinary load, the yield link starts to function and will smoothly and gradually yield with increasing resistance.

A load diagram, Fig. 4, shows the typical curve of the loads during the full yielding stroke. Owing to the slightly tapered inside of the bushing the yielding load increases with the greater yield travel until the piston is seated on the plug. The bulkhead then has sufficient camber which prevents undue stresses under the load causing it to bulge.

From the foregoing description, it will be seen that a yielding device has been provided which can be produced commercially for any predetermined yielding load and which is adjustable for variations in the distance of the parts to be connected and which at the same time permits tensional adjustment on the parts connected. The yield link is much cheaper in cost and simpler in application than formerly used resilient devices. The bulkheads, owing to their large size, ordinarily have sufficient inherent resiliency to dispense with separate resilient means for that purpose. Paint or chalk marks can readily be applied to show any amount of yielding that may have taken place and whether it is deemed necessary to replace the ductile bushing by a new one.

While this yield link is especially advantageous in combination with an airship bulkhead, it will be apparent that it can be used in substantially any relation in which members are required to be yieldably connected.

Likewise it will be understood from the foregoing description that the exact structure of the yield bushing and its contacting piston and cylinder can be widely varied. As for example the bushing piston ball and inner cylinder wall can be of similar or unlike polygonal, serrated, or round shapes. Tapers, bulges or the like can be used as occasioned by the load characteristics desired.

Although I have illustrated but the preferred form of the invention and only for one particular type of load-yield diagram, and have described that form in detail, it will be apparent to those skilled in the art that the invention is not so limited but that various modifications may be made therein without departing from the spirit of the invention or from the scope of the appended claims.

We claim:

1. A yield link between two parts comprising a hollow body connected to one of said parts, a yielding means contained in the body, and a piston connected to the other of said parts for expanding and pressing the yielding means against the body when the piston is forced through the yielding means after a certain load applied to the piston is exceeded.

2. A yield link between two parts, comprising a hollow body connected to one of said parts, a hollow plug secured to one end of said body, a soft bushing snugly fitting within the body and bearing against the plug, and a piston connected to the other of said parts for expanding and pressing the bushing against the body when the piston is forced through the bushing after a certain load applied to the piston is exceeded, the plug serving the piston as a stop and seat after completion of the yield stroke.

3. A yield link between two parts, comprising a hollow body connected to one of said parts, a hollow plug secured to one end of said body, a bushing of ductile material fitting snugly within the body, and a piston of substantially spherical shape connected to the other of said parts for expanding and pressing the bushing against the body when the piston is forced through the bushing after a certain load applied to the piston is exceeded, the plug serving the piston as a stop and seat after completion of the yield stroke.

4. A yield link between two parts comprising a hollow body connected to one of said parts, a plug secured to one end of said body, a copper bushing snugly fitting within the body and bearing against the plug, and a piston connected to the other of said parts for expanding and pressing the bushing against the body when the piston is forced through the bushing after a certain load applied to the piston is exceeded, the plug serving the piston as a stop and seat after completion of the yield stroke.

5. A yield link between two parts comprising a hollow body connected to one of said parts, a plug secured to one end of said body, a bushing provided with serrations on its outside fitting snugly within the body and bearing against the plug, and a piston connected to the other of said parts for expanding and pressing the bushing against the body when the piston is forced through the bushing after a certain load applied to the piston is exceeded, the plug serving the piston as a stop and seat after completion of the yield stroke.

6. A yield link between two parts comprising a hollow body connected to one of said parts and provided with a plurality of depressions in its interior, a plug secured to one end of said body, a bushing fitting snugly within the body and bearing against the plug, and a piston connected to the other of said parts for expanding and pressing the bushing into said depressions when the piston is forced through the bushing after a certain load applied to the piston is exceeded, the plug serving the piston as a stop and seat after completion of the yield stroke.

7. A yield link between two parts comprising a hollow body connected to one of said parts, a plug secured to one end of said body, a bushing fitting snugly within the body and bearing against the plug, one of the contacting surfaces between the body and bushing being provided with displacement openings, and a piston connected to the other of said parts for expanding and pressing the bushing against the body and into said openings when the piston is forced through the bushing after a certain load applied to the piston is exceeded.

8. A yield link between two parts comprising a hollow body connected to one of said parts, a plug secured to one end of said body, a bushing fitting snugly within the body and having a slightly tapered aperture lengthwise thereof and bearing against the plug, at least one of the contacting surfaces between the body and bushing being provided with openings into which the metal of the bushing can be displaced, and a piston connected to the other of said parts and received in the bushing and adapted to expand and press the bushing against the body and into said openings when the piston is forced through the bushing after a certain load applied to the piston is exceeded, the dimensions of the aperture of the bushing decreasing in the direction of movement of the piston on the yielding stroke, the plug serving as a stop and seat for the piston at the end of its yielding stroke.

9. A yield link between two parts comprising a hollow body connected to one of said parts, a yielding means contained in the body, a piston connected to the other of said parts for expanding and pressing the yielding means against the body when the piston is forced through the yielding means after a certain load applied to the piston is exceeded, and adjusting means for altering the length of the yield link.

10. A yield link between two parts comprising a hollow cylinder connected to one of said parts, a bushing of ductile material fitting snugly within the cylinder and having a slightly tapered bore, and a piston connected to the other of said parts and having a spherical shape for expanding and pressing the bushing against the body when the piston is forced through the bushing after a certain load applied to the piston is exceeded, said tapered bore of the bushing being positioned so that the inside diameter of the bushing decreases in the direction of the movement of the piston on the yielding stroke.

11. A yield link between two parts comprising a hollow body connected to one of said parts, a soft bushing fitting snugly within the body, a piston connected to the other of said parts and being slightly larger in diameter than the bore of the bushing for expanding and pressing the bushing against the body when the piston is forced through the bushing after a certain load applied to the piston is exceeded, and detachable means to prevent movement of the piston until the yielding device is in actual service.

12. A yield link between two parts comprising a hollow body connected to one of said parts, a soft bushing fitting snugly within the body, a piston connected to the other of said parts and being slightly larger in diameter than the bore of the bushing for expanding and pressing the bushing against the body when the piston is forced through the bushing after a certain load applied to the piston is exceeded, a threaded piston rod with supplementary turnbuckle members for changing the length of the yielding device, and detachable means to prevent movement of the piston until the yielding device is in actual service.

13. A yield link between two parts comprising a hollow body connected to one of said parts, a soft bushing fitting snugly within the body, a piston connected to the other of said parts and being slightly larger in diameter than the bore of the bushing for expanding and pressing the bushing against the body when the piston is forced through the bushing after a certain load applied to the piston is exceeded, a threaded piston rod with supplementary turnbuckle members for changing the length of the yielding device, of which the turnbuckle members extend within the body, and detachable means to prevent movement of the piston until the yielding device is in actual service.

14. In a device of the type described two members for connecting two parts and adapted to have limited relative movement with respect to each other and soft metal means normally preventing any movement of said members, but adapted to flow or displace when said loads are exceeded, to allow yielding relative movement of the members, said soft metal means being designed to give gradually increased resistance to relative movement of the members, additional means to releasably lock the members against movement even on overloads, turnbuckle means associated with the members and providing adjustable connections for the device.

15. In a device of the type described two members for connecting two parts and adapted to have limited relative movement with respect to each other and soft metal means normally preventing any movement of said members, but adapted to flow or displace when set loads are exceeded, to allow yielding relative movement of the members, said soft metal means being designed to give gradually increased resistance to relative movement of the members.

16. In a device of the type described two members for connecting two parts and adapted to have relative movement with respect to each other and soft metal means normally preventing any movement of said members, but adapted to flow or displace when set loads are exceeded, to allow yielding relative movement of the members.

17. In a device of the type described two members for connecting two parts and adapted to have relative movement with respect to each other and soft metal means normally preventing any movement of said members, but adapted to flow or displace when set loads are exceeded, to allow yielding relative movement of the members, and additional means to releasably lock the members against movement even on overloads.

18. A yield link between two parts comprising a hollow body connected to one of said parts, a yielding means contained in the body and having a predetermined shape, and a piston connected to the other of said parts for expanding and pressing the yielding means against the body when the piston is forced through the yielding means after a certain load applied to the piston is exceeded, the yielding load during the yield stroke being controlled by the shape of the yielding means.

WOLFGANG B. KLEMPERER.
PAUL D. FFIELD.

CERTIFICATE OF CORRECTION.

Patent No. 2,050,187. August 4, 1936.

WOLFGANG B. KLEMPERER, ET AL.

It is hereby certified that error appears in the printed specification of the above numbered patent requiring correction as follows: Page 3, second column, line 75, claim 14, for "said" read set; and that the said Letters Patent should be read with this correction therein that the same may conform to the record of the case in the Patent Office.

Signed and sealed this 17th day of November, A. D. 1936.

Henry Van Arsdale (Seal) Acting Commissioner of Patents.